US004001736B2

United States Statutory Invention Registration [19]

[11] Reg. Number: H1736

[45] Published: Jun. 2, 1998

Legare et al.

[54] HIGH PURITY FLUOROELASTOMER COMPOSITIONS

[75] Inventors: John Michael Legare, Newark, Del.; Eric William Thomas, Hudson, Ohio

[73] Assignee: E. I. du Pont de Nemours and Company, Wilmington, Del.

[21] Appl. No.: 720,338

[22] Filed: Sep. 27, 1996

Related U.S. Application Data

[63] Continuation of Ser. No. 308,064, Sep. 16, 1994, abandoned.

[51] Int. Cl.[6] ..... C08F 114/20

[52] U.S. Cl. ..... 525/194

[58] Field of Search ..... 524/462, 520, 524/545, 546; 525/199, 200

[56] References Cited

U.S. PATENT DOCUMENTS 5,461,107 10/1995 Amin et al. ..... 524/495

*Primary Examiner*—Charles T. Jordan
*Assistant Examiner*—Meena Chelliah

[57] ABSTRACT

Fluoroelastomer compositions with minimal concentrations of extractable metal species exhibit excellent performance characteristics under conditions requiring exceptional purity.

30 Claims, No Drawings

HIGH PURITY FLUOROELASTOMER COMPOSITIONS

RELATED APPLICATION

This is a continuation of application Ser. No. 08/308,064, filed Sep. 16, 1994 abandoned on Oct. 16, 1996.

BACKGROUND OF THE INVENTION

Fluoroelastomers such as those described in U.S. Pat. Nos. 3,682,872, 4,281,092 and 4,592,784 have achieved outstanding commercial success and are used in a wide variety of applications in which unusually severe environments are encountered, including exposure to high temperatures and aggressive chemicals. Those fluoroelastomers based on vinylidene fluoride copolymerized with hexafluoropropylene and, optionally, tetrafluoroethylene have been particularly successful. A preferred type of fluoroelastomer is that described in Moore, U.S. Pat. No. 5,032,655, containing both bromine and iodine in the basic polymer structure, while particularly desirable perfluoroelastomers are described in Apotheker et al., U.S. Pat. No. 4,035,565.

These compositions have found utility as components of elastomeric seals, for example o-rings, which are capable of performance for extended periods at high temperatures under conditions wherein exposure to corrosive chemicals occurs. Such seals are composed of cured fluoroelastomer compositions wherein the raw elastomer is compounded prior to cure with metal oxides, curing agents, and fillers, especially carbon black. Consequently, although the cured compositions provide excellent resistance to deterioration by corrosive chemicals, they are unsuitable for use in applications in which metal ion contamination cannot be tolerated. For example, manufacture of electronic components, in particular, semiconductor devices, and manufacture of pharmaceutical compounds require that the products, as well as the fluids used in the manufacturing processes, do not contact any source of extractable metals. Fluoroelastomer seals compounded using metal oxides and carbon black are thus unsuitable for use in such processes.

Cured fluoroelastomer compositions which do not contain carbon black and acid acceptors generally have inadequate physical properties, particularly poor mechanical strength, and high off-gassing characteristics. Therefore, elimination of these components will not provide an acceptable seal composition, especially for use at high temperatures. There is thus a need in the art for a cured fluoroelastomer composition which is free of metal-containing acid acceptors as well as carbon black, but which retains the physical properties necessary to permit use in applications requiring high temperature resistance.

SUMMARY OF THE INVENTION

The instant invention provides fluoroelastomer compositions which can be effectively used for stringent, high purity applications wherein the presence of metals or metal ions cannot be tolerated.

Specifically, the instant invention provides a fluoroelastomer composition substantially free of carbon black comprising:

(A) at least one peroxide-curable elastomeric fluoropolymer;

(B) about 0.1–5.0 parts by weight per 100 parts by weight of (A) of an organic amine having a pKa of at least 10;

(C) about 0.1–5.0 parts by weight per 100 parts by weight of (A) of an organic peroxide; and (D) about 0.1–10.0 parts by weight per 100 parts by weight of (A) of a coagent for the organic peroxide;

the composition having less than 500 parts per billion, based on the weight of (A), of metallic extractables.

DETAILED DESCRIPTION OF THE INVENTION

The compositions of the present invention exhibit a combination of physical properties, curing characteristics, and purity not previously known. These compositions can be used in a wide variety of applications that require exceptionally high purity. Typical of such applications are those found in the electronic and pharmaceutical industries.

A wide variety of elastomeric fluoropolymers can be used in the compositions of the present invention, including both perfluoropolymers as well as hydrogen-containing fluoropolymers. The fluoropolymers contain moieties which render the polymer crosslinkable by use of peroxide curing systems.

Hydrogen-containing fluoropolymers which can be used in this invention are generally based on vinylidene fluoride ($VF_2$) monomer. The most common hydrogen-containing fluoropolymers are copolymers of $VF_2$ with hexafluoropropylene (HFP) and, optionally, tetrafluoroethylene (TFE). However, the use of other fluoromonomers and of monomers that do not contain fluorine is also contemplated. Other monomers that can be used include chlorotrifluoroethylene (CTFE), hydrocarbon olefins such as ethylene (E) or propylene (P), and perfluoro(alkyl vinyl) ethers (PAVE) having the formula $CF_2{=}CFO(CF_2CFXO)_nR_f$ wherein X is F or $CF_3$, n is 0–5, and $R_f$ is a perfluoroalkyl group of 1–6 carbon atoms. A preferred PAVE for use in hydrogen-containing fluoroelastomers is perfluoro(methyl vinyl) ether (PMVE). Fluoropolymers incorporating such monomers include TFE/$VF_2$/PMVE, E/TFE/PMVE, TFE/P and TFE/P/$VF_2$.

Elastomeric perfluoropolymers which can be utilized in the compositions of the present invention are prepared from two or more perfluorinated monomers, and include those fluoroelastomers prepared from TFE and one or more PAVE. Minor portions of the TFE can be replaced by other perhaloolefins, such as CTFE. Perfluoro(propyl vinyl) ether (PPVE), PMVE, and certain perfluoro(alkylvinyl) ethers for which n is not zero in the formula above are preferred comonomers.

Both the hydrogen-containing fluoropolymers and the perfluoropolymers contain peroxide crosslinkable moieties as a result of the presence of copolymerized cure site monomer units. Normally, such copolymerized monomer units are present in the polymer in concentrations of up to about 3 mol %. Examples of suitable monomers include bromotetrafluorobutene, bromotrifluoroethylene, brominated fluoro(vinyl ethers), vinylidene fluoride, and monomers containing cyano groups.

Alternatively or additionally, non-perfluorinated chain transfer agents can be used in the polymerization reaction to introduce desirable fragments into the polymer for curing purposes. Such fragments are considered cure site moieties in the context of the present invention. Suitable chain transfer agents include di-iodo compounds that introduce bound iodine into the polymer chain, commonly at the end(s) of the molecule.

Representative peroxide-curable fluoropolymers which can be used in the present compositions are described in Apotheker et al., U.S. Pat. No. 4,035,565; Tatemoto et al., U.S. Pat. No. 4,243,770; Albin, U.S. Pat. No. 4,564,662; Arcella et al., U.S. Pat. No. 4,745,154; Moore, U.S. Pat. No.

4,948,852; Moore, U.S. Pat. No. 4,973,633; Logothetis, U.S. Pat. No. 4,948,853; Breazeale, U.S. Pat. No. 4,281,092, Finlay, U.S. Pat. No. 4,529,784, Logothetis, U.S. Pat. No. 4,972,038 and Arcella et al., U.S. Pat. No. 5,177,148.

The fluoroelastomer compositions of the present invention further include about 0.1–5.0 parts by weight per hundred parts by weight of fluoroelastomer (phr), preferably 0.1 to 1.0 phr, of an organic acid acceptor that is an amine having a pKa of at least 10. The organic amine compounds replace the inorganic, metal-containing acid acceptors which are commonly used in fluoroelastomer curing formulations. The substitution does not adversely affect the desirable high temperature resistant properties of the fluoroelastomer compositions. Organic amines useful in the practice of the invention have a pKa of at least 10, preferably at least about 12. One such amine that has been found to be particularly satisfactory is 1,8-bis-(dimethylamino)- naphthalene, commercially available from Aldrich Chemical Company as Proton Sponge®. Another particularly satisfactory amine is octadecylamine, commercially available from Akzo Chemicals, Inc. as Armeen® 18-D. The amines function as cure accelerators, process aids, and acid scavenging agents. They have been found to increase the state of cure of the cured fluoroelastomer, thereby improving physical properties and resistance to compression set.

In addition, the use of these compounds also substantially reduces the concentration of anionic extractables, particularly fluorides, in the cured fluoroelastomer.

The fluoroelastomer compositions of the present invention further comprise about 0.1–5.0 phr of at least one organic peroxide. A wide variety of organic peroxides can be used, provided the organic peroxide is of the alkyl type. One organic peroxide that has been found to be particularly satisfactory is 2,5-dimethyl-2,5-di-(t-butylperoxy)hexane, commercially available from Atochem, Inc. as Lupersol® 101. The organic peroxide has been found to be particularly satisfactory in concentrations of about 1–3 phr. While some forms of the organic peroxide are available on an inert carrier, such as Luperco® 101-XL (45% active ingredient), the concentrations indicated are based on 100% active organic peroxide.

In addition, the fluoroelastomer compositions of the present invention further comprise organic coagent to aid in the crosslinking reaction. In general, the coagent is present in an amount between about 0.1 and about 10 phr, and preferably between 2 and 5 phr. A wide variety of organic coagents can be used, including triallyl isocyanurate, trimethylallyl isocyanurate, and trimethylolpropane trimethacrylate, of which trimethylallyl isocyanurate has been found to be particularly satisfactory. Triallyl isocyanurate and trimethylallyl isocyanurate are available from the DuPont Company as Diak #7 and Diak #8. Trimethylolpropane trimethacrylate is commercially available from the Sartomer Company as Saret® 350.

In accordance with the present invention, it has been found that satisfactory performance for fluoroelastomers in certain applications requires the absence or particularly low concentrations of certain components. Consequently, the polymers, curing agents, and additives used as components of compositions of the present invention must be substantially free of metals, metal compounds and carbon black. Representative of such metals and metal compounds are calcium, iron, potassium, sodium, aluminum, copper, nickel, zinc, barium and titanium, and compounds thereof, in particular, such common additives as calcium hydroxide, magnesium oxide, and zinc oxide. In general, the concentrations of total metallic extractables should be less than about 500 parts per billion (ppb), based on 100 parts by weight of the fluoroelastomer, and particularly desirable performance characteristics are obtained when total metallic extractables are less than 200 ppb.

It is a particular objective of the present invention to provide compositions which do not act as sources of metal contamination. This includes compositions substantially free of inorganic compounds.

Consequently, the compositions of the present invention are substantially free of fillers which contain metallic residues, particularly carbon black. Carbon black contains significant concentrations of metallic residues which are extractable by many process fluids. Therefore, use of carbon black as a filler in compositions of the present invention would preclude their use in applications wherein metal contamination must be avoided.

In a preferred embodiment of the present invention, the fluoroelastomer composition further comprises about from 1 to 50 phr of a fluoropolymer filler, and preferably at least about 5 phr of the filler. The fluoropolymer filler used in the high purity fluoroelastomer composition can be any finely divided, easily dispersed plastic fluoropolymer that is solid at the highest temperature utilized in fabrication and curing of the fluoroelastomer composition. By solid, it is meant that the fluoroplastic, if partially crystalline, will have a crystalline melting temperature above the processing temperature (s) of the fluoroelastomer(s). If amorphous, the fluoroplastic will have a glass transition temperature above the processing temperature(s) of the fluoroelastomer(s). Such finely divided, easily dispersed fluoroplastics are commonly called micropowders or fluoroadditives. Micropowders are ordinarily partially crystalline polymers.

Micropowders that can be used in the composition of the this invention include but are not limited to those based on the group of polymers known as tetrafluoroethylene (TFE) polymers. This group includes homopolymers of TFE (PTFE) and copolymers of TFE with such small concentrations of at least one copolymerizable modifying monomer that the resins remain non-melt-fabricable (modified PTFE). The modifying monomer can be, for example, hexafluoropropylene (HFP), perfluoro(propyl vinyl) ether (PPVE), perfluorobutyl ethylene, chlorotrifluoroethylene, or another monomer that introduces side groups into the polymer molecule. The concentration of such copolymerized modifiers in the polymer is usually less than 1 mol %. The PTFE and modified PTFE resins that can be used in this invention include both those derived from suspension polymerization and from emulsion polymerization.

High molecular weight PTFE used in production of micropowder is usually subjected to ionizing radiation to reduce molecular weight. This facilitates grinding and enhances friability if the PTFE is produced by the suspension polymerization process, or suppresses fibrillation and enhances deagglomeration if the PTFE is produced by the emulsion polymerization process. It is also possible to polymerize TFE directly to PTFE micropowder by appropriate control of molecular weight in the emulsion polymerization process, such as disclosed by Kuhls el al. in U.S. Pat. No. 3,956,000. Morgan in U.S. Pat. No. 4,879,362 discloses a non-melt-fabricable, non-fibrillating modified PTFE produced by the emulsion (dispersion) polymerization process. This polymer forms platelets on shear blending into elastomeric compositions, instead of fibrillating. If the viscosity of the host fluoroelastomer of the high purity composition of this invention is high, Morgan's polymer in required concentration may increase viscosity to unacceptable levels and a different micropowder should be selected.

TFE polymers also include melt-fabricable copolymers of TFE having sufficient concentrations of copolymerized units of one or more monomers to reduce the melting point significantly below that of PTFE. Such copolymers generally have melt viscosity in the range $0.5–60\times10^3$ Pa·s, but viscosities outside this range are known.

Perfluoroolefins and perfluoro(alkyl vinyl) ethers are preferred comonomers. HFP and PPVE are most preferred. Melt fabricable TFE copolymers such as FEP (TFE/HFP copolymer) and PFA (TFE/PPVE copolymer) can be used in the high purity fluoroelastomer compositions of this invention, provided they satisfy the constraint on melting temperature with respect to fluoroelastomer processing temperature. These copolymers can be used in powder form as isolated from the polymerization medium, if particle size is acceptable, or they can be ground to suitable particle size starting with stock of larger dimensions.

In general, at least about 1 phr, based on the weight of the peroxide-curable elastomeric fluoropolymer, of the fluoropolymer filler is used, generally less than about 50 phr. Preferably, about 5–35 phr of the fluoropolymer filler is used in the present compositions. Those fluoropolymer fillers commercially available from the DuPont Company as Teflon® fluoroadditives MP-1500 and MP-1600 have been found to be particularly satisfactory in the present invention.

The compositions can further include additives to enhance processability, as will be evident to those skilled in the art. Suitable process aids include low molecular weight polyethylenes, vegetable waxes, and aromatic sulfones. The compositions of the present invention can further comprise at least about 1 phr of plasticizer, generally less than about 20 phr, based on the weight of the fluoroelastomer(s). Amounts less than about 10 phr are preferred. Plasticizers which have been found particularly satisfactory include perfluoropolyethers.

Fluoroelastomer compositions of the present invention exhibit generally lower metallic, anionic and TOC (total organic carbon) extractables than previously known compositions. As result, they are especially suited for use in semiconductor wet chemical process applications as well as in other types of high purity applications.

The following examples, wherein all parts are by weight unless otherwise indicated, illustrate certain embodiments of the present invention.

EXAMPLES

TEST METHODS

The following test procedures are used to determine extractables:

Experimental Procedure

Extraction vessels (250-ml jars made of Teflon® PFA 440-HP, with screw lids) were filled with ultrapure deionized water, capped with a screw lid and placed in a nitrogen-purged oven at 80° C. for 16 hours. The deionized water was discarded after each rinse. The above procedure was repeated five times to effectively precondition the extraction vessels. The extraction vessels were then filled with the appropriate test fluid and placed in an oven for 72 hours @ 80° C. The test fluid was discarded and the procedure repeated. The following high purity grade chemicals were used as the extraction test fluids in this study.

(a) 18 mega-ohm Ultrapure Deionized Water (UPDI)

(b) "Piranha" —3:1 (v/v) of 96% Sulfuric Acid and 30% hydrogen peroxide

O-ring test specimens were first preconditioned by rinsing with ultrapure deionized water, followed by soaking in ultrapure deionized water for 20 minutes in a polypropylene container in an ultrasonic bath.

Preconditioned extraction vessels were filled with 100 mls of the appropriate test fluid. One AS568A size-214 o-ring (total surface area 1.540 sq. in.; estimated contact surface area 1.385 sq. in.) was placed in the test fluid and the extraction vessel capped. The o-ring was immersed in the test fluid for 1 month at 80° C. Two o-ring samples were tested per each compound example listed in Tables II and VI. Three blanks (test fluid only) were also run per test fluid.

After immmersion, the o-rings were removed from the extraction vessel and rinsed with ultrapure deionized water to remove residual test fluid. The extract was analyzed for metallic, anionic and total organic carbon extractables using a number of different analytical techniques. Metallic extractables analyses were performed using ICP-MS (Inductively Coupled Plasma-Mass Spectroscopy). Calcium and Iron analyses were performed using GFAA (Graphite Furnace Atomic Absorption). Anionic and cationic extractable analyses were performed using Ion Chromatography. TOC (Total Organic Carbon) analyses were performed using a TOC analyzer. Test results are listed in Tables III, IV, VII and VIII. All test results have been blank corrected. Results are expressed as ppb (parts per billion) leached in 100 mls of test fluid @ 80° C. for 1 month from 1 o-ring.

No carbon filler is added to the compositions of the present invention, and the compositions exhibit a low Total Organic Carbon content.

In the following examples, compounds of the fluoroelastomer with other specified ingredients were prepared on a two-roll rubber mill with the rolls heated to a temperature not greater than about 60° C., depending on the specific polymer being processed. In the mill mixing process, the fluoroelastomer polymer is first introduced to the roll nip alone, milled until a band is formed and the polymer is well blended, and milled until a rolling bank is maintained on the mill. Additives, including Teflon® fluoroadditive, which were previously weighed out, were then added to the nip and the resulting composition milled until uniform.

The compounded blends were converted to a form suitable for physical property testing by compression molding into either dumbells or o-rings. Curing and postcuring followed procedures outlined in the various examples. Specimens for physical property testing were prepared from die-cut sheet stock as called for by the test methods summarized in Table I.

TABLE I

PHYSICAL TEST METHODS

| Symbol | Physical Property | Test Method |
|---|---|---|
| $M_{100}$ | Modulus @ 100% Elongation | ASTM D-412 |
| $T_B$ | Tensile strength @ break | ASTM D-412 |
| $E_B$ | Elongation @ break | ASTM D-412 |
| H | Durometer A Hardness | ASTM D-2240 |
| CS | Compression Set | ASTM D-395 & ASTM D-1414 |

COMPARATIVE EXAMPLE A

Perfluoroelastomer Polymer A, an elastomeric copolymer of TFE, PMVE and 8-CNVE (approximate monomer weight ratio: 56/42/2) in which 8-CNVE is the curesite monomer perfluoro-(8-cyano-5-methyl-3, 6-dioxa-1-octene), was prepared generally as described in U.S. Pat. No. 4,281,092 then compounded with carbon black, tetraphenyltin and other ingredients as shown in Table II, and molded/postcured and tested according to procedures described above. O-ring test specimens were presscured for 20 min @ 210°C., then postcured in a nitrogen atmosphere in a circulating oven at 90° C. for 6 hr, followed by a uniform transition to 305° C. over 10 hr and in turn followed by 26 hr @ 305° C. Physical property test results are listed in Table II. "Wet" chemical extraction test results are listed in Tables III and IV. The results listed in Table II are based on the average of three test specimens. The wet chemical extraction test results listed in Tables III and IV are based on the average of two samples tested.

COMPARATIVE EXAMPLE B

Perfluoroelastomer Polymer B is an elastomeric copolymer of TFE, PMVE and $VF_2$ (approximate monomer weight ratio: 57.5/42/0.5) in which $VF_2$ is the curesite monomer vinylidene fluoride. It was generally prepared as described in U.S. Pat. No. 4,529,784. Polymer B was compounded with carbon black, zinc oxide and other ingredients as listed in Table II, molded/postcured and tested according to the procedures described above. O-ring test specimens were presscured for 30 min @ 210°C., then postcured in a nitrogen atmosphere in a circulating oven by first increasing the temperature slowly from room temperature to 260° C. over a 40 hr period followed by postcuring for 8 hr @ 260° C. Physical property test results are summarized in Table II. "Wet" chemical extraction test results are summarized in Tables III and IV. The results in Table II are based on the average of three test specimens. The wet chemical extraction test results in Table III and IV are based on the average of two samples tested.

EXAMPLES 1–3

Perfluoroelastomer Polymer C is an elastomeric copolymer of TFE, PMVE and BTFB (approximate monomer weight ratio: 57/42/1) in which BTFB is the curesite monomer 4-bromo-3,3,4,4-tetrafluorobutene. It was prepared generally as described in U.S. Pat. No. 4,035,065. Polymer C was compounded with trimethylallyl isocyanurate (TMAIC) and other ingredients as listed in Table II, molded/postcured and tested according to procedures described above. O-ring test specimens were prepared from die cut sheet stock. Specimens were presscured for 10 min @ 177° C., then postcured in a nitrogen atmosphere in a circulating oven by first increasing the temperature slowly from room temperature to 232° C. over a 40 hr period followed by postcuring for 8 hr @ 232° C. Physical property test results are listed in Table II. "Wet" chemical extraction test results are listed in Table III and Table IV. The results listed in Table II are based on the average of three test specimens. The wet chemical extraction test results listed in Table III and IV are based on the average of two samples tested.

TABLE II

EXAMPLES/FORMULATIONS
PHYSICAL PROPERTY TEST RESULTS

| EXAMPLE | A | B | 1 | 2 | 3 | 4 |
|---|---|---|---|---|---|---|
| FORMULATION (phr) | | | | | | |
| Polymer A | 100.0 | — | — | — | — | — |
| Polymer B | — | 100.0 | — | — | — | — |
| Polymer C | — | — | 100.0 | 100.0 | 100.0 | — |

TABLE II-continued

EXAMPLES/FORMULATIONS
PHYSICAL PROPERTY TEST RESULTS

| EXAMPLE | A | B | 1 | 2 | 3 | 4 |
|---|---|---|---|---|---|---|
| Polymer D | — | — | — | — | — | 100.0 |
| SAF Carbon Black (a) | 12.0 | 10.0 | — | — | — | — |
| 18-Crown-6 (b) | 0.3 | — | — | — | — | — |
| DCH 18-Crown-6 (c) | — | 4.0 | — | — | — | — |
| Zinc Oxide (d) | — | 4.0 | — | — | — | — |
| TEFLON ® MP-1600 Fluoro-additive (e) | — | — | — | 5.0 | 5.0 | — |
| Perfluoro-polyether Oil (f) | — | 10.0 | — | — | 5.0 | — |
| Proton Sponge ® (g) | — | — | 0.5 | 0.5 | 0.5 | 0.5 |
| Triallyliso-cyanurate | — | 1.5 | — | — | — | — |
| Trimethyl-allyliso-cyanurate | — | — | 2.0 | 3.0 | 3.0 | 3.0 |
| Luperco ® 101-XL Peroxide | — | 1.5 | 3.0 | 4.0 | 4.0 | 4.0 |
| Tetraphenyltin | 3.0 | — | — | — | — | — |
| $K_2AF$ Curative (h) | — | 5.0 | — | — | — | — |
| PHYSICAL PROPERTIES | | | | | | |
| $M_{100}$, psi | 1119 | 1395 | 636 | 947 | 711 | 595 |
| $T_B$, psi | 1622 | 1611 | 1516 | 2005 | 1598 | 1326 |
| $E_B$, psi | 123 | 114 | 181 | 177 | 180 | 173 |
| H, pts | 81 | 84 | 81 | 86 | 82 | 80 |
| CS, % | 29.6 | 33.1 | 39.5 | 45.7 | 46.7 | 35.2 |

(a) Cabot Corporation
(b) Parish Chemical Co.
(c) Dicyclohexyl-18-Crown-6, PCR, Inc.
(d) Kadox ® 911, Zinc Corp. of America
(e) Low Molecular Weight PTFE, DuPont Company
(f) Krytox ® fluorinated oil 143AD, DuPont Company
(g) 1,8-Bis-(dimethylamino)naphthalene, Aldrich Chemical Company
(h) Dipotassium Salt of bisphenol AF

TABLE III

ULTRAPURE DEIONIZED WATER EXTRACTABLES FOR 1 MONTH @ 80° C.
LEACHABLES FROM 1O-RING PER 100 MLS OF TEST FLUID
BLANK CORRECTED RESULTS

| EXAMPLES | A (ppb) | B (ppb) | 1 (ppb) | 2 (ppb) | 3 (ppb) | 4 (ppb) |
|---|---|---|---|---|---|---|
| METALLIC EXTRACTABLE DETECTED | | | | | | |
| Al | 9.5 | 18.4 | 0.9 | 2.6 | 1.2 | 2.1 |
| Cu | 0.9 | 0.6 | 0.2 | 0.2 | 0.5 | 0.9 |
| Mg | 2.7 | 3.9 | | | 0.5 | 0.6 |
| Zn | 0.5 | 71.1 | 0.4 | 0.3 | 0.6 | 0.5 |
| Ni | | 2.8 | | | | |
| Fe | 3.6 | 1.5 | | | | |
| Ca | 15.4 | 29.9 | 41,5 | 64 | 71 | 76.5 |
| K | 3.5 | 71.5 | | | | |
| Na | 7 | 6.4 | 2.5 | 7.5 | 4 | 2 |
| ANIONIC (IC) EXTRACTABLES | | | | | | |
| Sulfate | 11.5 | 4.4 | 5.6 | 4.8 | 4 | 5.1 |
| Fluoride | 6600 | 335 | 10.2 | 12 | 12.5 | 43 |

TABLE III-continued

ULTRAPURE DEIONIZED WATER EXTRACTABLES FOR 1 MONTH @ 80° C.
LEACHABLES FROM 1O-RING PER 100 MLS OF TEST FLUID
BLANK CORRECTED RESULTS

| EXAMPLES | A (ppb) | B (ppb) | 1 (ppb) | 2 (ppb) | 3 (ppb) | 4 (ppb) |
|---|---|---|---|---|---|---|
| Bromide | | 5.3 | 3 | 2.1 | 4.9 | |
| Chloride | 23 | | 2.2 | 5.5 | 4 | 2 |
| TOTAL ORGANIC CARBON (TOC) (ppb) | 1540 | 965 | 866 | 725 | 864 | 956 |

TABLE IV

"PIRANHA" EXTRACTABLES ($H_2SO_4$:$H_2O_2$) FOR 1 MONTH @ 80° C.
LEACHABLES FROM 1 O-RING PER 100 MLS OF TEST FLUID
BLANK CORRECTED TEST RESULTS

| EXAMPLES | A (ppb) | B (ppb) | 1 (ppb) | 2 (ppb) | 3 (ppb) | 4 (ppb) |
|---|---|---|---|---|---|---|
| ELEMENTAL EXTRACTABLE DETECTED | | | | | | |
| Al | | 48.5 | | | | 0.1 |
| Cu | | | 1.2 | | | |
| Ni | | 10.7 | | | | |
| Mg | 17 | 15.3 | 1.3 | 1.6 | | |
| Ba | | 0.7 | | 1.1 | | |
| Sn | 234 | | | | | |
| Zn | | 2665 | | | | |
| Pb | | 1.4 | | | | |
| Cr | | | 0.4 | 1.7 | | 0.9 |
| Fe | | 162 | 18 | 18.5 | 10 | 11.5 |
| Ca | | 558 | 41.5 | 78 | 132 | 86 |

EXAMPLE 4

Perfluoroelastomer Polymer D is an elastomeric copolymer of TFE, PMVE and perfluoro-(8-cyano-5-methyl-3,6-dioxa-1-octene) (8-CNVE) (approximate monomer weight ratio: 54.5/43/2.5) and having about 0.2 wt % iodine on the ends of polymer chains. It was prepared generally as described in U.S. Pat. No. 4,972,038. Polymer D was compounded with trimethylallyl isocyanurate (TMAIC) and other ingredients as listed in Table II, molded/postcured and tested according to procedures described above. O-ring test specimens were prepared from die cut sheet stock. Specimens were presscured for 10 min @ 177° C., then postcured in a nitrogen atmosphere in a circulating oven by first increasing the temperature slowly from room temperature to 232° C. over a 40 hr period followed by postcuring for 8 hr @ 232° C. Physical property test results are listed in Table II. "Wet" chemical extraction test results are listed in Table III and IV. The results listed in Table II are based on the average of three test-specimens. The wet chemical extraction test results in Tables III and IV are based on the average of two samples tested.

EXAMPLE 5

A peroxide-curable elastomeric fluoropolymer E was prepared having a composition of 38% PMVE, 35% $VF_2$, 26% TFE, 1% BTFB, and 0.18% iodine by weight. Mooney viscosity was measured as ML-10 (121° C.)=25.

A curable fluoroelastomer composition was prepared by mixing the following ingredients on a two-roll mill whose rolls were heated to about 25° C.: 100 parts by weight of fluoropolymer E, 3 parts triallyl isocyanurate (TAIC), 2 parts Lupersol® 101 peroxide [2,5-dimethyl-2,5-di-(t-butylperoxy) hexane], and 0.5 parts octadecylamine.

The composition was cured, and the cure characteristics were measured with an oscillating disc rheometer (ODR) at a cure time of 12 minutes at 177° C. according to ASTM D 2084 (3 deg. arc). The time required to obtain 90% of the cure state as determined by t'90 was 2.4 minutes. Test samples were press-cured for 10 min at 177° C. and post-cured in a circulating air oven for 24 hr at 200° C. Stress-strain properties were determined to be 100% modulus, $M_{100}$ =1.2 MPa tensile strength at break, $T_B$ =3.2 MPa elongation at break, $E_B$=186%

Hardness was determined according to ASTM D 2240 as Durometer A=52 points. Compression set, measured on O-rings according to ASTM D 1414 in air, was 41% after 70 hr at 200° C. The results are reported in Table V.

TABLE V

Curing of TFE/$VF_2$/PMVE Fluoroelastomer

| EXAMPLE | 5 |
|---|---|
| Fluoropolymer E | 100 |
| Diak #7 | 3 |
| Armeen 18D | 0.5 |
| Lupersol 101 | 2 |
| STOCK PROPERTIES | |
| ODR 100 @ 177° C. 3° Arc. 12 Minute Motor | |
| M-L (lbs-in) | 7.5 |
| MH (lbs-in) | 62.4 |
| Ts2 (min) | 1.0 |
| Tc50 (min) | 1.6 |
| Tc90 (min) | 2.4 |
| MDR 2000 @ 177° C. 0.5° Arc. 6 Minute Motor | |
| M-L (lbs-in) | 0.6 |
| MH (lbs-in) | 16.6 |
| Ts2 (min:sec) | 0:33 |
| Tc50 (min:sec) | 0:42 |
| Tc90 (min:sec) | 1:07 |
| VULCANIZATE PROPERTIES | |
| Press Cure: 10 Min./177° C. | Post Cure: 24 Hrs./200° C. |
| Physical Properties @ R.T. - Original | |
| 50% Modulus, MPa | 0.9 |
| 100% Modulus, MPa | 1.2 |
| Tensile Strength, MPa | 3.2 |
| Elongation @ Break % | 186 |
| Hardness, Duro A, Pts. | 52 |
| Specific Gravity | 1.79 |
| Compression Set, Method B | |
| 22 Hrs./200° C., % | 21.3 |
| 70 Hrs./200° C., % | 41.4 |

EXAMPLES 6 and 7

Fluoropolymer E of Example 5 was used in Example 6. For Example 7, a peroxide-curable fluoropolymer F was prepared containing 50% $VF_2$, 29% HFP, 20% TFE, 0.6% BTFB, and 0.2% iodine by weight. Mooney viscosity was measured as ML-10 (121° C.)=25.

A curable fluoroelastomer composition was prepared by mixing the following ingredients on a two-roll mill whose rolls were heated to about 25° C.: 100 parts by weight fluoropolymer E, 3 parts triallyl isocyanurate (TAIC), 4 parts Luperco® 101-XL peroxide and 0.5 parts octadecyl amine. Cure characteristics of the composition were measured with an oscillating disc rheometer (ODR) at a cure time of 12 minutes at 177° C. according to ASTM D 2084 (3deg.arc). The time required to obtain 90% of the cure state as determined by t'90 was 3.4 minutes. Test samples were press-cured for 10 minutes at 177° C. and post-cured in a circulating air oven for 24 hours at 200° C. Stress-strain properties were determined according to ASTM D 412 as 100% modulus, $M_{100}$=1.4 MPa; tensile strength at break, $T_B$=5.2 MPa; elongation at break, $E_B$=186%. Hardness was determined according to ASTM D 2240 as Durometer A=52 points. Compression set, measured on O-rings according to ASTM D 1414 in air, was 41% after 70 hours at 200° C. The results are reported in Table VI.

COMPARATIVE EXAMPLE C

A representative elastomeric vinylidene fluoride/hexafluoropropylene copolymer, Fluoropolymer G, crosslinked with bisphenol cure system containing divalent metal, was prepared so that a comparison could be made with the peroxide-curable fluoroelastomers shown in Table VI. This was prepared in the same manner and cure conditions as those in Example 6 and results are shown in Tables VI, VII and VIII.

COMPARATIVE EXAMPLE D

Fluoropolymer E was compounded as described in Example 6, except for the addition of an inorganic pigment as shown in Table VI. It was then cured under the same conditions as described in Example 6 and results are shown in Tables VI, VII and VIII.

TABLE VI

Curing of TFE/$VF_2$/PMVE, TFE/HFP/$VF_2$, and HFP/$VF_2$ Fluoroelastomers

| EXAMPLE | 6 | 7 | C | D |
|---|---|---|---|---|
| Fluoropolymer E | 100 | — | — | 100 |
| Fluoropolymer F | — | 100 | — | — |
| Fluoropolymer G | — | — | 100 | — |
| TEFLON ® MP1500 | 25 | 25 | 25 | 25 |
| Triallylisocyanurate | 3 | 3 | — | 3 |
| Armeen 18D | 0.5 | 0.5 | — | 0.5 |
| Luperco ® 101-XL Peroxide | 4 | 4 | — | 4 |
| Magnesium Oxide (a) | — | — | 3 | — |
| Calcium Hydroxide | — | — | 6 | — |
| Ti-Pure ® R960 (b) | — | — | — | 5 |
| STOCK PROPERTIES | | | | |
| Moonel Viscosity | | | | |
| ML 1 + 10/121° C. | 23.7 | 27.6 | 41.9 | 25.3 |
| ODR 100 @ 177° C. 3° Arc. 12 Minute Motor | | | | |
| M-L (lbs-in) | 14.1 | 15.3 | 13 | 13.9 |
| MH (lbs-in) | 80.9 | 68.2 | 77.3 | 81.9 |
| Ts2 (min:sec) | 0.9 | 1 | 2.5 | 0.9 |
| Tc50 (min:sec) | 1.5 | 1.7 | 3.3 | 1.5 |
| Tc90 (min:sec) | 2.4 | 2.7 | 3.5 | 2.4 |
| MDR 2000 @ 177° C. 1° Arc. 6 Minute Motor | | | | |
| M-L (lbs-in) | 1.9 | 2.5 | 2.2 | 1.8 |
| MH (lbs-in) | 24.6 | 20.7 | 26.6 | 26 |
| Ts2 (min:sec) | 0:26 | 0:28 | 1:29 | 0:26 |
| Tc50 (min:sec) | 0:37 | 0:39 | 1:44 | 0:36 |

TABLE VI-continued

Curing of TFE/$VF_2$/PMVE, TFE/HFP/$VF_2$, and HFP/$VF_2$ Fluoroelastomers

| EXAMPLE | 6 | 7 | C | D |
|---|---|---|---|---|
| Tc90 (min:sec) | 1:05 | 1:04 | 2:23 | 1:01 |
| VULCANIZATE PROPERTIES | | | | |
| Press Cure: 10 Min./177° C. | Post Cure: 24 Hrs./232° C. | | | |
| Physical Properties @ R.T. - Original | | | | |
| Hardness, Duro A, Pts. | 68 | 68 | 67 | 68 |
| 50% Modulus, MPa | 1.7 | 1.7 | 1.6 | 1.7 |
| 100% Modulus, MPa | 2.5 | 2.5 | 2.1 | 2.6 |
| Tensile Strength, MPa | 6 | 7.5 | 5.4 | 5.7 |
| Elongation @ Break % | 213 | 279 | 242 | 194 |
| Specific Gravity | 1.904 | 1.89 | 1.905 | 1.942 |
| Compression Set Method B | | | | |
| 70 Hr./23° C., % | 9.7 | 13.9 | 5.5 | 8.3 |
| 70 Hr./150° C., % | 20.8 | 18.1 | 11.1 | 19.4 |
| 336 Hr/150° C., % | 26.4 | 32.0 | 13.9 | 27.8 |
| 70 Hr./200° C., % | 47.2 | 44.4 | 22.2 | 47.2 |
| 336 Hr/200° C., % | 73.6 | 77.8 | 33.4 | 87.5 |
| 70 Hr./250° C., % | 93.1 | 94.5 | 59.7 | 97.1 |
| Heat Resistance, 70 Hr. @ 200° C. | | | | |
| Hardness, Duro A, Pts. | 69 | 69 | 67 | 70 |
| Hardness Change, Pts. | 1 | 1 | 0 | 2 |
| 100% Modulus, MPa | 2.7 | 3.0 | 2.3 | 2.9 |
| Modulus Change, % | −8 | −20 | −10 | −12 |
| Tensile Strength, MPa | 6.9 | 9.5 | 6.3 | 7.2 |
| Tensile Change, % | 15 | 27 | 17 | 26 |
| Elongation @ Break, % | 223 | 289 | 254 | 209 |
| Elongation Change, % | 5 | 4 | 5 | 8 |
| Weight Change, % | −2.8 | −2.6 | −0.2 | −3.0 |
| Heat Resistance, 70 Hr. @ 250° C. | | | | |
| Hardness, Duro A, Pts. | 63 | 65 | 67 | 64 |
| Hardness Change, Pts. | −5 | −3 | 0 | −4 |
| 100% Modulus, MPa | 1.3 | 1.9 | 2.3 | 2.3 |
| Modulus Change, % | −48 | −24 | 5 | −12 |
| Tensile Strength, MPa | 4.2 | 6.7 | 6.0 | 6.4 |
| Tensile Change, % | −30 | −11 | 11 | 12 |
| Elongation @ Break, % | 396 | 378 | 251 | 334 |
| Elongation Change, % | 86 | 35 | 4 | 72 |
| Weight Change, % | −2.9 | −2.6 | −1.5 | −3.1 |
| Heat Resistance, 70 Hr. @ 275° C. | | | | |
| Hardness, Duro A, Pts. | 59 | 61 | 66 | 61 |
| Hardness Change, Pts. | −9 | −7 | −1 | −7 |
| 100% Modulus, MPa | 1.8 | 1.9 | 1.9 | 1.9 |
| Modulus Change, % | −28 | −24 | −10 | −27 |
| Tensile Strength, MPa | 4.9 | 4.2 | 5.7 | 5.6 |
| Tensile Change, % | −18 | −44 | 6 | −2 |
| Elongation @ Break, % | 400 | 273 | 308 | 383 |
| Elongation Change, % | 88 | −2 | 27 | 97 |
| Weight Change, % | −6.1 | −6.0 | −4.6 | −6.4 |

(a) Marine Magnesium Company
(b) Titanium dioxide - DuPont Company

TABLE VII

Ultrapure Deionized Water (UPDI) @ 80° C. for 1 month
Blank Corrected Results
ICP-MS/GF-AA/IC/TOC

| Metallic Extractable Detected Example | 6 | 7 | C | D |
|---|---|---|---|---|
| Al | 1.3 | 2.6 | 4.5 | 2.3 |
| Cu | 0.1 | 0.8 | 0.4 | 0.5 |
| Mg | 1.9 | 1.7 | 61.2 | 1.6 |
| Zn | 1.1 | 0.5 | 0.2 | 0.4 |

TABLE VII-continued

Ultrapure Deionized Water (UPDI) @ 80° C. for 1 month
Blank Corrected Results
ICP-MS/GF-AA/IC/TOC

| Metallic Extractable Detected Example | 6 | 7 | C | D |
|---|---|---|---|---|
| Ba | | 13.5 | 23.6 | |
| Fe | 12.4 | 0.9 | 0.9 | 0.9 |
| Ca | 157.4 | 43.9 | >400 | 43.9 |
| K | 3.3 | 2.4 | 8 | 2.4 |
| Na | 4.9 | 5.6 | 16.5 | 5.6 |
| Total Metallic Extractables | 182.4 | 71.9 | >515.3 | 57.6 |
| Anionic/Cationic Extractables (IC) | | | | |
| Bromide | 20.7 | 13.5 | 5.1 | 24 |
| Chloride | | | 0.6 | |
| Fluoride | 236.4 | 17 | 268 | 30.4 |
| Phosphate | 2.6 | | 3.1 | 2.6 |
| Sulfate | 24.2 | 9 | 25 | 24.2 |
| Total Organic Carbon (TOC) | 1750 | 1910 | 2650 | 2000 |

TABLE VIII

Piranha ($H_2SO_4$:$H_2O_2$) @ 80° C. for 1 month
Blank Corrected Results
ICO-MS/GF-AA

| Metallic Extractable Detected Example | 6 | 7 | C | D |
|---|---|---|---|---|
| Al | 3.2 | 10.6 | 7.8 | 2.2 |
| Cu | 3.4 | | | |
| Mg | 1.4 | 2 | 195.7 | 1.1 |
| Ba | | 13.3 | 33.7 | |
| Cr | 2.1 | 1.7 | 2.4 | 1.4 |
| Fe | 12.5 | 12.4 | 30.5 | 19 |
| Ca | 49.1 | 38.6 | 572 | 46.9 |
| Na | 6.6 | 5.1 | 10.1 | 5.1 |
| K | 0.4 | 1.9 | 2.9 | |
| Ti | | | | 7.1 |
| Total Metallic Extractables | 78.7 | 85.6 | 855.1 | 146.4 |

The data shown in Tables III, IV, VII, and VIII demonstrate the effect that various compound additives (metallic acid acceptors and crosslinking agents, elemental carbon fillers, inorganic pigments, etc.) have on performance in wet chemical environments. Of the fluoroelastomer compound examples tested, Examples 1 through 4, 6 and 7 exhibit generally lower metallic, anionic and TOC extractables in both ultrapure deionized water and in "piranha" compared to Comparative Examples A through D. Comparative Example A exhibits high anionic and TOC extractables in ultrapure deionized water and high metallic (tin) extractables in "piranha". The high tin extractables in "piranha" can be directly attributed to the use of a metallic crosslinking catalyst in Comparative Example A. Comparative Example B exhibits high metallic (zinc and potassium) extractables in ultrapure deionized water and high metallic (zinc) extractables in "piranha". The high zinc extractables in both ultrapure deionized water and in "piranha" can be directly attributed to the use of a metallic oxide acid acceptor and metallic crosslinking agent in Comparative Example B.

Comparative Example C exhibits high metallic (calcium) extractables in ultrapure deionized water and high metallic (calcium and magnesium) extractables in "piranha". This can be directly attributed to the use of both calcium hydroxide and magnesium oxide as acid acceptors/cure accelerators in Comparative Example C. Metallic oxides are typically used as acid acceptors in fluoroelastomer compounds. They serve primarily as "acid scavengers", absorbing hydrogen fluoride generated as a curing process by-product. However, they can also serve as potential sources of extractables in wet chemical process environments.

Comparative Example D exhibits high metallic (titanium) extractables in "piranha". This can be directly attributed to the use of titanium dioxide as an inorganic pigment in Comparative Example D. Examples 1 through 7 have been specifically formulated for use in semiconductor wet chemical process applications. They avoid the use of metallic oxide acid acceptors and metallic crosslinking agents through the use of novel compounding techniques.

We claim:

1. A fluoroelastomer composition substantially free of carbon black comprising:

(A) at least one peroxide-curable elastomeric fluoropolymer;

(B) about 0.1–5.0 parts by weight per 100 parts by weight of (A) of an organic amine having a pKa of at least 10;

(C) about 0.1–5.0 parts by weight per 100 parts by weight of (a) of an organic peroxide;

(D) about 0.1–10.0 parts by weight per 100 parts by weight of (A) of a coagent for the organic peroxide; and (E) at least about 1 part by weight per 100 parts by weight of (A) of a fluoropolymer filler;

the composition having less than 500 parts per billion, based on the weight of (A), of metallic extractables.

2. A fluoroelastomer composition of claim 1 wherein the fluoropolymer filler consists essentially of a polymer of tetrafluoroethylene.

3. A fluoroelastomer composition of claim 1 wherein the elastomeric fluoropolymer is a perfluoropolymer.

4. A fluoroelastomer composition of claim 1 wherein the elastomeric fluoropolymer is a hydrogen-containing fluoropolymer.

5. A fluoroelastomer composition of claim 2 wherein the fluoropolymer filler consists essentially of PTFE or modified PTFE.

6. A fluoroelastomer composition of claim 2 wherein the fluoropolymer filler consists essentially of a melt-fabricable copolymer of TFE and PPVE.

7. A fluoroelastomer composition of claim 2 wherein the fluoropolymer filler consists essentially of a melt-fabricable copolymer of TFE and HFP.

8. A fluoroelastomer composition of claim 1 wherein the organic amine consists essentially of 1,8-bis-(dimethylamino)napthalene.

9. A fluoroelastomer composition of claim 1 wherein the organic amine consists essentially of octadecylamine.

10. A fluoroelastomer composition of claim 1 wherein the organic peroxide consists essentially of 2, 5-dimethyl-2,5-di-(t-butylperoxy) hexane.

11. A fluoroelastomer composition of claim 1 further comprising at least about 1 phr of plasticizer.

12. A fluoroelastomer composition of claim 11 wherein the placticizer consists essentially of perfluoropolyether.

13. A fluoroelastomer composition of claim 1 wherein the extractable metals and metal compounds are present in quantities of less than about 200 parts per billion.

14. A fluoroelastomer composition of claim 1 wherein the fluoroelastomer composition is substantially free of inorganic compounds.

15. An elastomeric seal for use in processes requiring high purity wherein the presence of metals or metal ions must be controlled, the seal comprising:

(A) at least one peroxide-curable elastomeric fluoropolymer;

(B) about 0.1–5.0 parts by weight per 100 parts by weight of (A) of an organic amine having a pKa of at least 10;

(C) about 0.1–5.0 parts by weight per 100 parts by weight of (A) of an organic peroxide; and (D) about 0.1–10.0 parts by weight per 100 parts by weight of (A) of a coagent for the organic peroxide;

the composition having less than 500 parts per billion, based on the weight of (A), of metallic extractables and being substantially free of carbon black.

16. A fluoroelastomer composition of claim 15 further comprising at least about 1 phr fluoropolymer filler.

17. A fluoroelastomer composition of claim 16 wherein the fluoropolymer filler consists essentially of a polymer of tetrafluoroethylene.

18. A fluoroelastomer composition of claim 15 wherein the elastomeric fluoropolymer is a perfluoropolymer.

19. A fluoroelastomer composition of claim 15 wherein the elastomeric fluoropolymer is a hydrogen-containing fluoropolymer.

20. A fluoroelastomer composition of claim 16 wherein the fluoropolymer filler consists essentially of PTFE or modified PTFE.

21. A fluoroelastomer composition of claim 16 wherein the fluoropolymer filler consists essentially of a melt-fabricable copolymer of TFE and PPVE.

22. A fluoroelastomer composition of claim 16 wherein the fluoropolymer filler consists essentially of a melt-fabricable copolymer of TFE and HFP.

23. A fluoroelastomer composition of claim 15 wherein the organic amine consists essentially of 1,8-bis (dimethylamino)naphthalene.

24. A fluoroelastomer composition of claim 15 wherein the organic amine consists essentially of octadecylamine.

25. A fluoroelastomer composition of claim 15 wherein the organic peroxide consists essentially of 2,5-dimethyl-2,5-di-(t-butylperoxy)hexane.

26. A fluoroelastomer composition of claim 15 further comprising at least about 1 phr of plasticizer.

27. A fluoroelastomer composition of claim 26 wherein the plasticizer consists essentially of perfluoropolyether.

28. A fluoroelastomer composition of claim 15 wherein the metallic extractables are present in quantities of less than about 200 parts per billion based on the weight of (A).

29. A fluoroelastomer composition of claim 15 wherein the fluoroelastomer composition is substantially free of inorganic compounds.

30. A composition of any of claims 15–25 wherein the seal is cured.

* * * * *